United States Patent
Horiuchi et al.

(10) Patent No.: US 8,236,361 B2
(45) Date of Patent: Aug. 7, 2012

(54) METHOD FOR PRODUCING FERMENTED MILK AND FERMENTED MILK

(75) Inventors: Hiroshi Horiuchi, Odawara (JP); Nobuko Inoue, Odawara (JP); Naoki Orii, Odawara (JP)

(73) Assignee: Meiji Co., Ltd, Tokyo (JP)

( * ) Notice: Subject to any disclaimer, the term of this patent is extended or adjusted under 35 U.S.C. 154(b) by 1608 days.

(21) Appl. No.: 10/537,493

(22) PCT Filed: Dec. 2, 2003

(86) PCT No.: PCT/JP03/15377
§ 371 (c)(1), (2), (4) Date: Jun. 3, 2005

(87) PCT Pub. No.: WO2004/049812
PCT Pub. Date: Jun. 17, 2004

(65) Prior Publication Data
US 2006/0040016 A1 Feb. 23, 2006

(30) Foreign Application Priority Data
Dec. 3, 2002 (JP) .............................. P.2002-350772

(51) Int. Cl.
*A23C 9/12* (2006.01)
(52) U.S. Cl. ........................................................ 426/34
(58) Field of Classification Search ................ 426/34
See application file for complete search history.

(56) References Cited

U.S. PATENT DOCUMENTS

| 1,866,184 | A | 7/1932 | Wehsarg et al. |
| 5,453,286 | A | 9/1995 | Castberg et al. |
| 5,716,811 | A | 2/1998 | Nauth et al. |
| 5,962,046 | A | 10/1999 | Eyer et al. |
| 2003/0096037 | A1 * | 5/2003 | Zindel et al. .................. 426/37 |

FOREIGN PATENT DOCUMENTS

| DE | 196 17 521 A1 | 12/1997 |
| DE | 197 36 643 A1 | 2/1999 |
| EP | 1 082 907 A2 | 3/2001 |
| JP | 10-99019 A | 4/1998 |
| JP | 10-155420 A | 6/1998 |
| JP | 2001-112437 A | 4/2001 |
| JP | 2002-191294 A | 7/2002 |
| WO | WO-0224870 | * 3/2002 |

OTHER PUBLICATIONS

Badr, H. R. et al. 2001. Continuous acetone-ethanol-butanol fermentation by immobilized cells of Clostridium acetobutylicum. Biomass & Bioenergy. 20:119-132.*
Holland, K. T. et al. Tertiary Level Biology, Anaerobic Bacteria. Chapman & Hall, New York.(1987). Pages: book cover, (v), 50-51, 10-11.*

(Continued)

*Primary Examiner* — D. Lawrence Tarazano
*Assistant Examiner* — Hamid R Badr
(74) *Attorney, Agent, or Firm* — Sughrue Mion, PLLC

(57) ABSTRACT

Disclosed is a method for producing fermented milk by promoting fermentation without adding any fermentation-promoting substance and novel fermented milk with a thick and smooth mouth feel and a mild flavor. The method enhances fermentation efficiency by reducing the dissolved oxygen in a mix of raw materials for fermented milk at the start of fermentation through substitution with inert gases.

9 Claims, 2 Drawing Sheets

OTHER PUBLICATIONS

S. Shekar et al., "Influence of Dissolved Oxygen on Acid Production in Buffalo Milk by Lactic Cultures" (1983), Journal of Food Protection, vol. 46, No. 4, pp. 321-324.

International Search Report dated Mar. 1, 2004.

XP-000822827 (1999), "Technische Gase", pp. 275-281.

Partial European Search Report dated Dec. 14, 2005.

European Patent Office, Communication dated Aug. 4, 2011 in counterpart European application No. 03776005.5.

* cited by examiner

METHOD FOR PRODUCING FERMENTED MILK AND FERMENTED MILK

This is a National Stage application under 35 U.S.C. §371 of PCT/JP03/015377 filed on Dec. 2, 2003, which claims priority from Japanese patent application 2002-350772 filed on Dec. 3, 2002, all of which are incorporated herein by reference.

TECHNICAL FIELD

The present invention relates to a novel method for producing milk which promotes fermentation without using any fermentation-promoting substance, and a novel fermented milk obtained by the method.

BACKGROUND OF THE INVENTION

Fermented milk is a paste or liquid product obtained by fermenting milk, or milk or the like containing solid contents of nonfat milk at the same level or higher, with lactic acid bacteria or yeast, or a dried product thereof, and is broadly classified into two types. One is a pre-fermented type, while the other is a post-fermented type. The former is produced by packing into an individual container for distribution the fermented milk crushed after the completion of fermentation and cooling in a tank before packing into a container. The latter is produced by packing a mix of raw materials for fermented milk added with a predetermined amount of a starter (referred to as mix hereinafter) into an individual container for distribution such as a paper container, and subsequently fermenting the mix in a fermentation chamber until the lactic acid acidity reaches a predetermined level for solidification into a purine-like state, followed by cooling. The pre-fermentation is commonly used for producing fruit yogurt with fruit flesh, drinking yogurt and the like, while the post-fermentation is commonly used for producing yogurt of so-called hard-type and plain-type, and the like.

In any case of the fermentation types, a starter is added to a sterilized mix at a predetermined temperature, and fermentation is carried out until the acidity reaches a predetermined acidity at the fermentation process. Then, the resulting product is cooled for terminating fermentation, to prepare a final product. Because the fermentation temperature and fermentation time at this period not only influence the production efficiency of the product but also give significant influences on the flavor and quality, it is necessary to set the fermentation temperature and the fermentation time appropriately with taking those influences into account. For example, the fermentation temperature should be set lower in a case of intending to give mild flavor to the product.

Herein, the production efficiency and product quality may be problematic since the fermentation time required to reach a given acidity is significantly prolonged in comparison with a usual method, and additionally, the texture hardness is so low that the texture may degrade during distribution process, for example in a case of setting the fermentation temperature lower to give mild flavor to the product. Accordingly, it has been very difficult to obtain fermented milk having mild flavor and a texture with hardness not degrading during distribution process.

No direct method for improving such present situation has been reported yet. However, the following approaches have been carried out as applicable methods. The first approach includes a method with adjusting conditions in which the efficiency of fermentation process is improved to shorten fermentation time. It is considered that such approach enables fermentation at a fermentation temperature lower than a usual method, other than the achievement of the purpose of improving the production efficiency. The second approach includes a method with selecting lactic acid bacteria which produce substances giving mild flavor. A third approach includes a method with giving additives improving flavor to such a product to give necessary texture such as mildness, without any modification of fermentation process.

As examples of the first method for promoting fermentation, a method which includes adding a whey protein concentrate (JP-A-11-028056) and a method which includes adding butter milk (JP-A-09-201164) have been proposed.

However, in these previous examples, low-temperature fermentation was not assumed, and it was not investigated whether or not fermentation can be promoted at low temperature. As an example of the second method, a method which includes fermentation with a selected lactic acid bacterium for use, to make L-lactic acid occupy 85% or more of total lactic acid bacteria to give a fresh and mild flavor to the fermented milk has been proposed (JP-A-06-327401). As an example of the third method, a method which includes adding amino acids having a specific composition to the fermented milk for improving the flavor has been proposed (JP-A-10-327751).

Any of these methods involves the addition of some substance to fermented milk or the modification of the composition of the components thereof. Therefore, it is inevitable to design the product while taking account of the influences of additives and the like over product flavor, quality and the like. In other words, these methods can neither improve production efficiency while the product feature of the original product is maintained without using additives and the like, nor add "mild flavor" while the production efficiency and the product feature of the original product is maintained.

DISCLOSURE OF THE INVENTION

An object of the present invention is to provide a method for producing fermented milk with an improved productivity by promoting fermentation without adding any fermentation-promoting substance and the like to shorten the fermentation time. Further, another object of the present invention is to provide a method for producing fermented milk, by which fermentation can be carried out at a temperature lower than the conventional temperature without almost any prolongation of fermentation time so that novel fermented milk products can be obtained, which have never been obtained conventionally, and a novel fermented milk obtained by the method.

The present inventors made dedicated investigations to solve the above-described objects. Consequently, the present inventors found that, in the production process of fermented milk, the increase of the lactic acid activity could be promoted without using any additives such as fermentation-promoting substances, by allowing fermentation in conditions that a dissolved oxygen concentration of the mix at the start of fermentation is reduced by substitution with inert gases such as nitrogen gas, so that the time required that the lactic acid acidity of the mix can reach the acidity for the termination of fermentation can greatly be shortened. Thus, the first object has been achieved.

Further, the inventors found that, in a case of fermentation at a fermentation temperature lower than general in conditions that a dissolved oxygen concentration of the mix is reduced, the lactic acid acidity of the mix can reach the acidity for the termination of fermentation within a fermentation time almost equal to the fermentation time in a case of carrying out fermentation at the general fermentation temperature.

Additionally, the inventors found that the fermented milk obtained in such a manner is novel fermented milk with a hard texture not degrading in the distribution process, which has never been achieved in products produced by conventional long-term fermentation at low temperature, although the fermented milk has a thicker and smoother mouth feel and a milder flavor than that of fermented milk produced by conventional long-term fermentation at low temperature. Thus, the inventors have achieved the second object.

In other words, the present invention can be enabled by the achievement of improving the fermentation efficiency by reducing the dissolved oxygen concentration in the mix at the start of fermentation by substitution with inert gases such as nitrogen gas in the production process of fermented milk, and the achievement of the characteristic profile with shortening the fermentation time or lowering the fermentation temperature with respect to a usual method.

Specifically, an invention relating to the method for producing fermented milk, which can shorten the fermentation time to improve the productivity can be achieved by carrying out fermentation at the general temperature in conditions that the dissolved oxygen concentration in the mix is reduced. Further, an invention, relating to a method for producing fermented milk with a hard texture enduring the distribution process, together with a thick and smooth mouth feel and a mild flavor which have never been realized by conventional methods, and a novel fermented milk obtained by the method, can be achieved by carrying out fermentation at a fermentation temperature lower than general in a condition that a dissolved oxygen concentration of the mix is reduced.

As described above, the method for producing fermented milk according to the present invention can bring about an effect of shortening the fermentation time to improve the productivity without using any additives such as fermentation-promoting substances when the fermentation temperature is within the general temperature range, and also enables that the acidity reach the necessary acidity within a fermentation time almost equal to the general fermentation time when the fermentation temperature is lower than general. The fermented milk obtained in such a manner has a thicker and smoother feel and a milder flavor in comparison with the products obtained by conventional long-term fermentation at low temperature, and keeps a texture hardness never observed in any conventional products, so that a fermented milk with novel values can effectively be provided.

BEST MODE FOR CARRYING OUT THE INVENTION

In accordance with the invention, the fermented milk means "fermented milk" defined according to the codex alimentarius.

The invention is achieved by reducing the dissolved oxygen concentration in the mix by substitution with inert gases such as nitrogen gas at the start of fermentation. In order to reduce the dissolved oxygen concentration at the start of fermentation, the process of substitution with inert gases may be carried out after preparing the mix, after sterilizing the mix or immediately after adding a lactic acid starter to the mix.

The mix can be obtained by heating and dissolving raw materials for regular use in producing fermented milk, for example, raw milk materials such as milk, skim milk, powdery skim milk and cream, sugar, saccharide, flavor, water and the like. In a case of using stabilizers, a mix can be obtained by adding and mixing a gelatin solution and the like, which is preliminarily heated and dissolved. Then, the obtained mix is homogenized, and cooled to a predetermined temperature (fermentation temperature) after the sterilization. Subsequently, a lactic acid starter is inoculated and agitated, which is then transferred into a tank for pre-fermentation to start fermentation, or packed into an individual container for distribution for post-fermentation to start fermentation. Further, a sugar solution and the like may be added to the mix after the completion of fermentation.

The substitution process with inert gases may be carried out in any period from the stage of blending the raw material mix to the initiation time of fermentation after the inoculation of the lactic acid starter, and the timing of substitution in the production process is optional. However, the substitution with inert gases may preferably be carried out in a period from the time immediately before the inoculation of the lactic acid starter to the time immediately after the inoculation thereof, since it is important that the conditions in which the dissolved oxygen concentration is reduced are maintained at the start of fermentation.

As the dissolved oxygen concentration in the mix at the start of fermentation is lower, further, better results can be obtained, and the concentration giving practically useful results is 5 ppm or less, preferably 3 ppm or less, and more preferably 2 ppm or less, at a mix temperature of from 30° C. to 40° C. If the mix temperature is not as described above, an evaluation of the dissolved oxygen concentration based on the above-described conditions will have to be made.

The inert gases for use in accordance with the present invention include nitrogen gas, argon gas and helium gas. Nitrogen gas can preferably be used as an inert gas for general use in foods. In order to reduce the dissolved oxygen in the mix, known methods may be used, including a method of directly bubbling these inert gases into the mix, a method of using a static mixer or a method of putting the inert gas together with the mix into a mixer for agitation.

As the lactic acid starter for inoculation in the mix, one or at least two species selected from lactic acid bacteria and yeasts for general use in producing fermented milk such as *Lactobacillus bulgaricus* (*L. bulgaricus*), *Streptococcus thermophilus* (*S. thermophilus*) and *Lactobacillus lactis* (*L. lactis*) may be used. In the present invention, a starter based on a mix starter of *Lactobacillus bulgaricus* (*L. bulgaricus*) and *Streptococcus thermophilus* (*S. thermophilus*) can preferably be used.

In addition, the fermentation temperature and the like may appropriately be determined in consideration of optimum conditions for each lactic acid bacteria, when the production efficiency is important. For example, the optimum temperature using the above-mentioned mix starter is 40° C. to 44° C. In this case, it is possible to shorten the fermentation time to about 80% to 70% of that of the general case, by using the method of the present invention. This effect can be observed irrespective of any fermentation type of "pre-fermentation" or "post-fermentation". In other words, by carrying out a production in such a manner, it is possible in any fermentation type to shorten the fermentation time of fermented milk, with adding an amount of a lactic acid starter which is same as in the conventional method without any addition of lactic acid growth-promoting substances. Thus, it is possible to obtain a product which is the same as the product obtained by conventional production methods, despite productivity being significantly improved.

In a case of giving a milder flavor to such a product than those of general products, low temperature conditions of from 30 to 37° C., preferably from 32 to 36° C., and more preferably from 34 to 36° C., should be selected as a fermentation temperature. In this case, the fermentation time varies depending on the fermentation temperature. In the case of using the method of the present invention, the acidity can reach the objective acidity at 34° C. to 35° C. within a fermentation time almost equal to the time at general fermentation temperature by conventional fermentation methods. In a case of decreasing the fermentation temperature to 30° C., the fermentation time is prolonged in comparison with a usual method. Even in this case, fermentation can be completed within a time of about 60% of the time when the method of the present invention is not carried out. Thus, the effect of the method of the present invention is apparent.

The fermented milk obtained under the low-temperature fermentation conditions in accordance with the present invention as described above can have excellent properties, compared with the products obtained by the conventional methods, particularly when the fermented milk is produced by post-fermentation type. Specifically, the fermented milk having a milder flavor than fermented milk produced at general fermentation temperature can be obtained. Additionally, fermented milk having a thicker and smoother mouth feel and a milder flavor than conventional fermented milk produced by fermentation at low temperature fox a long time can be obtained. Furthermore, the fermented milk produced by fermentation at low temperature according to the present invention has a texture so hard that the texture never degrades at the distribution stage, which is never realized in the conventional fermented milk produced by fermentation at low temperature for a long time. Thus, the fermented milk according to the present invention is a novel and useful fermented milk having a mild flavor which has never been obtained and a hard texture.

When the inventive method is applied to a pre-fermentation type, the resulting fermented milk does not have a hard texture, since the pre-fermentation requires a step of disrupting and packing the resulting curd. However, it is possible to obtain a fermented milk with a thicker and smoother mouth feel and a milder flavor than products produced by conventional fermentation at low temperature for a long time, according to the organoleptic assessment. When the fermentation temperature by a pre-fermentation type is the general temperature, it is needless to say that the effect of the present invention of shortening the fermentation time can be brought about. Further, in a case of deoxydized fermentation at low temperature, additional values such as hard occurrence of aqueous separation may possibly be given due to the difference in the pattern of the card formation from that of the conventional products.

The usefulness of the method according to the present invention will be described in detail by showing the following test examples.

First, a test example is shown, in which the influence of the dissolved oxygen concentration in the mix on the increase of lactic acid acidity (influence on fermentation time) is examined.

Test Example 1

Relationship Between Dissolved Oxygen Concentration in the Mix at the Start of Fermentation and the Increase of Lactic Acid Acidity A mix was prepared by mixing 78.2 kg of milk, 2.6 kg of powdery skim milk, and 17.2 kg of water. The mix was sterilized under heating at 95° C. for 5 minutes, and cooled to around 40° C. Subsequently, a lactic acid starter (a mix culture of *Lactobacillus bulgaricus* (*L. bulgaricus* JCM 1002T) and *Streptococcus thermophilus* (*S. thermophilus* ATCC 19258)) was inoculated at 2% by weight. Nitrogen gas was mixed and dispersed into the mix through a pipe, to adjust a dissolved oxygen concentration to 7, 6, 5, 4, 3 or 2 ppm. Then, the mixes prepared to have each dissolved oxygen concentration were packed into a 100-ml container, for static fermentation in a fermentation chamber around 40° C., until the lactic acid acidity reached around 0.7%. Just then, the resulting product was put in a refrigerator at 10° C. or less, for cooling and termination of fermentation. For comparison, a fermentation product without adjusting the dissolved oxygen concentration was used. In this case, the dissolved oxygen concentration in the mix at the stage of the inoculation of the lactic acid starter was 8 ppm.

The results of the change of the lactic acid acidity during fermentation in Test Example 1 are shown in FIG. 1. As apparently shown in the results, the lower the dissolved oxygen concentration in the mix before fermentation is, the more the fermentation time is shortened. The shortening effect becomes significantly apparent when the dissolved oxygen concentration is 5 ppm or less. In addition, when the dissolved oxygen concentration reaches 3 ppm or less, the difference from the effect of a conventional method (8 ppm) becomes more pronounced. Therefore, it is possible to determine that the dissolved oxygen concentration effective for shortening the fermentation time in the mix during fermentation is 5 ppm or less, preferably 3 ppm or less.

Next, a test example is shown, in which the influence of the fermentation temperature when the temperature is lowered than general and the properties of the resulting product thus obtained is examined.

Test Example 2

Relationship Among Fermentation Temperature, Fermentation Time and the Properties of the Resulting Fermented Milk A mix was prepared by mixing 78.2 kg of milk, 2.6 kg of powdery skim milk, and 17.2 kg of water. The mix was sterilized under heating at 95° C. for 5 minutes, and cooled to around 30, 35, 37, and 43° C. Subsequently, a lactic acid starter (a mix culture of *Lactobacillus bulgaricus* (*L. bulgaricus* JCM 1002T) and *Streptococcus thermophilus* (*S. thermophilus* ATCC 19258)) was inoculated at 2% by weight. Nitrogen gas was mixed and dispersed into the mix through a pipe, to adjust a dissolved oxygen concentration to 3 ppm or less. As comparative examples, mixes without any substitution with nitrogen gas at each temperature were prepared. Then, the mixes were respectively packed into 100-ml containers, for static fermentation in fermentation chambers at 30, 35, 37 and 43° C., until the lactic acid acidity reached around 0.7%. Just then, the resulting products were put in a refrigerator at 10° C. or less, for cooling and termination of fermentation to prepare fermented milk. In this regard, the lactic acid acidity was calculated by the titration with 0.1N NaOH by using phenolphthalein as an indicator.

The results are shown in Table 1.

TABLE 1

Comparison in fermentation time and physical properties of fermented milk fermented at low temperature by the method of the present invention and the conventional method
Method of the present invention: deoxygenation

| Fermentation temperature (° C.) | Fermentation method | Fermentation time (time required to reach lactic acid acidity of 0.7%) | Hardness (curd tension) (g) | Penetration angle of curd knife (°) |
|---|---|---|---|---|
| 30 | general | 9 hrs and 30 min | 20 | 30 |
| 30 | deoxygenation | 6 hrs | 40 | 13 |
| 33 | general | 6 hrs | 25 | 32 |
| 33 | deoxygenation | 4 hrs | 50 | 14 |
| 35 | general | 4 hrs and 15 min | 25 | 33 |
| 35 | deoxygenation | 3 hrs and 15 min | 50 | 19 |
| 37 | general | 3 hrs 40 min | 35 | 49 |
| 37 | deoxygenation | 3 hrs | 55 | 31 |
| 43 | general | 3 hrs | 60 | 50 |
| 43 | deoxygenation | 2 hrs and 30 min | 60 | 49 |

* Hardness was measured, using yogurt curd meter.
* The curd tension value for maintaining curd shape during distribution is about 40 g.
* It is evaluated that a smaller penetration angle of curd knife means smoother texture.

As apparently shown in the results of Table 1, according to the method of the present invention, the fermentation time required for the lactic acid acidity to reach around 0.7% is significantly shortened, in comparison with the case using the conventional method. Additionally, it is shown that the plain yogurt obtained by the method of the present invention has the hardness sufficiently enduring impact during distribution, which is indicated from the measured values of the physical properties (high hardness), together with the smoothness (small penetration angle of yogurt knife), at a fermentation temperature of 37° C. or Less.

Furthermore, the results of an organoleptic assessment with the two-point strength test using expert panelists, which was carried out on the fermented milk obtained by fermentation at a low temperature of 37° C., in accordance with the method of the present invention and the conventional method, are shown in Table 2. Consequently, it is shown that the product of the present invention is excellent in terms of "smooth texture on tongue", "mild taste" and "rich taste", in comparison with the conventional fermented milk obtained by long-term fermentation at low temperature. In addition, it is shown that the product of the present invention has mild flavor hardly causing acidic taste, although the acidity is almost same as the conventional products.

TABLE 2

Results of organoleptic assessment of the method of the present invention and the conventional method with the two-point strength test

| Item | P is smoother | Q is smoother | Unclear |
|---|---|---|---|
| Smooth texture on tongue | 26 | 8 | 6 |
| Item | P is milder | Q is milder | Unclear |
| Mild taste | 26 | 10 | 4 |
| Item | P has richer taste | Q has richer taste | Unclear |
| Rich taste ("koku") | 20 | 10 | 10 |
| Item | P has stronger acidic taste | Q has stronger acidic taste | Unclear |
| Acidity level | 12 | 23 | 5 |

Number of test subjects: 40 persons
Plain yogurt fermented at 37° C.
P: deoxydization low-temperature fermentation method (method of the present invention)
Q: low-temperature, long-term fermentation method (conventional method)

Results

Significant difference was observed concerning the above items between the two samples.

In order to observe how curd formation progressed by each of the methods, curd formation was compared among general fermentation (43° C.), general low-temperature fermentation (37° C.) and the low-temperature fermentation (37° C.) with a reduced dissolved oxygen concentration in accordance with the present invention, concerning post-fermentation and pre-fermentation. Consequently, both the post-fermentation and the pre-fermentation resulted in almost the same results. FIG. 2 shows the results in the case of the post-fermentation. Since curd formation starts after the lactic acid acidity reaches about 0.4%, it is assumed that the time period required for curd formation is the time period required for the lactic acid acidity of 0.4% to reach the intended acidity of 0.7%. FIG. 2 shows that in a case of using the method of the present invention, the start of curd formation occurs earlier although the whole fermentation takes a short fermentation time, than general low-temperature fermentation. Thus, the time required for curd formation is the longest among the three examined methods. It is considered that this may be one of the causes of the thick and smooth mouth feel and the mild flavor of the resulting product in accordance with the method of the present invention.

The results of the aforementioned Test Examples show that the method of the present invention has more excellent characteristic properties than the conventional production methods. The method of the present invention is now described in more detail in the following Examples. However, the invention is not limited to these Examples.

Example 1

Production of Pre-Fermented Yogurt by Low-Temperature Fermentation

A mix was prepared by mixing 80.0 kg of milk, 3.1 kg of powdery skim milk, 1.1 kg of salt-free butter, and 13.8 kg of water. The mix was sterilized under heating at 95° C. for 5 minutes, and cooled to around 35° C. Subsequently, a lactic acid starter (a mix culture of *Lactobacillus bulgaricus* (*L. bulgaricus* JCM 1002T) and *Streptococcus thermophilus* (*S. thermophilus* ATCC 19258)) was inoculated at 2% by weight. Nitrogen gas was mixed and dispersed into the mix through a pipe, to adjust a dissolved oxygen concentration to 3 ppm or less. Concurrently, a mix without any substitution with nitrogen gas was prepared. Herein, the amount of dissolved oxygen in each sample was measured by using a DO meter (manufactured by To a DKK Co., Ltd.) and inserting the electrodes in each sample.

Subsequently, these samples were fermented in a tank around 35° C., until the lactic acid acidity reached around 0.7%. Then, the resulting curd was crushed and cooled to 10° C. or less, for termination of fermentation to produce fermented milk. Lactic acid acidity was calculated by the titration with 0.1N NaOH by using phenolphthalein as an indicator. Consequently, the acidity of 0.7% was achieved within 3 hours of fermentation time by the nitrogen-substituted low-temperature fermentation method of the present invention, while it took a fermentation time of 4.5 hours by the conventional low-temperature and long-term fermentation method.

Example 2

Production of Post-Fermented Yogurt by Low-Temperature Fermentation

A mix was prepared by mixing 78.2 kg of milk, 2.6 kg of powdery skim milk, and 17.2 kg of water. The mix was sterilized under heating at 95° C. for 5 minutes, and cooled to around 37° C. subsequently, a lactic acid starter (a mix culture of *Lactobacillus bulgaricus* (*L. bulgaricus* JCM 1002T) and *Streptococcus thermophilus* (*S. thermophilus* ATCC 19258)) was inoculated at 2% by weight. Nitrogen gas was mixed and dispersed into the mix through a pipe, to adjust a dissolved oxygen concentration to 3 ppm or less. As a control, a mix without any substitution with nitrogen gas at each temperature was prepared. Then, the mixes were respectively packed into 100-ml containers, for static fermentation in fermentation chambers at 37° C., until the lactic acid acidity reached around 0.7%. Just then, the resulting products were put in a refrigerator at 10° C. or less, for cooling and termination of fermentation to prepare fermented milk. In this regard, the lactic acid acidity was calculated by the titration with 0.1N NaOH by using phenolphthalein as an indicator.

Additionally, the physical properties of yogurt were measured, using a neocurd meter M302 (I. techno Engineering: Iio electric Co., Ltd. under old name). Specifically, the penetration angle of yogurt knife with a weight of 100 g was measured. Then, the elasticity until break of the penetration angle curve obtained was defined as hardness (g), while the angle was used as an indicator of smoothness (the angle is a value up to 90°; and a smaller value represents a smoother texture). When the hardness of yogurt as measured with the meter is 40 g or more, it is suggested that the texture is stable so that it is not disrupted with the impact during delivery and the like.

Consequently, the hardness and the penetration angle according to the method of the present invention were 55 g and 30°, respectively, while the hardness and the penetration angle according to the conventional method were 35 g and 50°, respectively. Thus, it is confirmed that the fermented milk produced by the method of the present invention is smoother and has a hardness with which the texture can be maintained at distribution stage, in view of the physico-chemical properties. Additionally, in terms of practical flavor, it is also confirmed that the product of the present invention has a denser and smoother taste than the conventional products.

Figure 1:
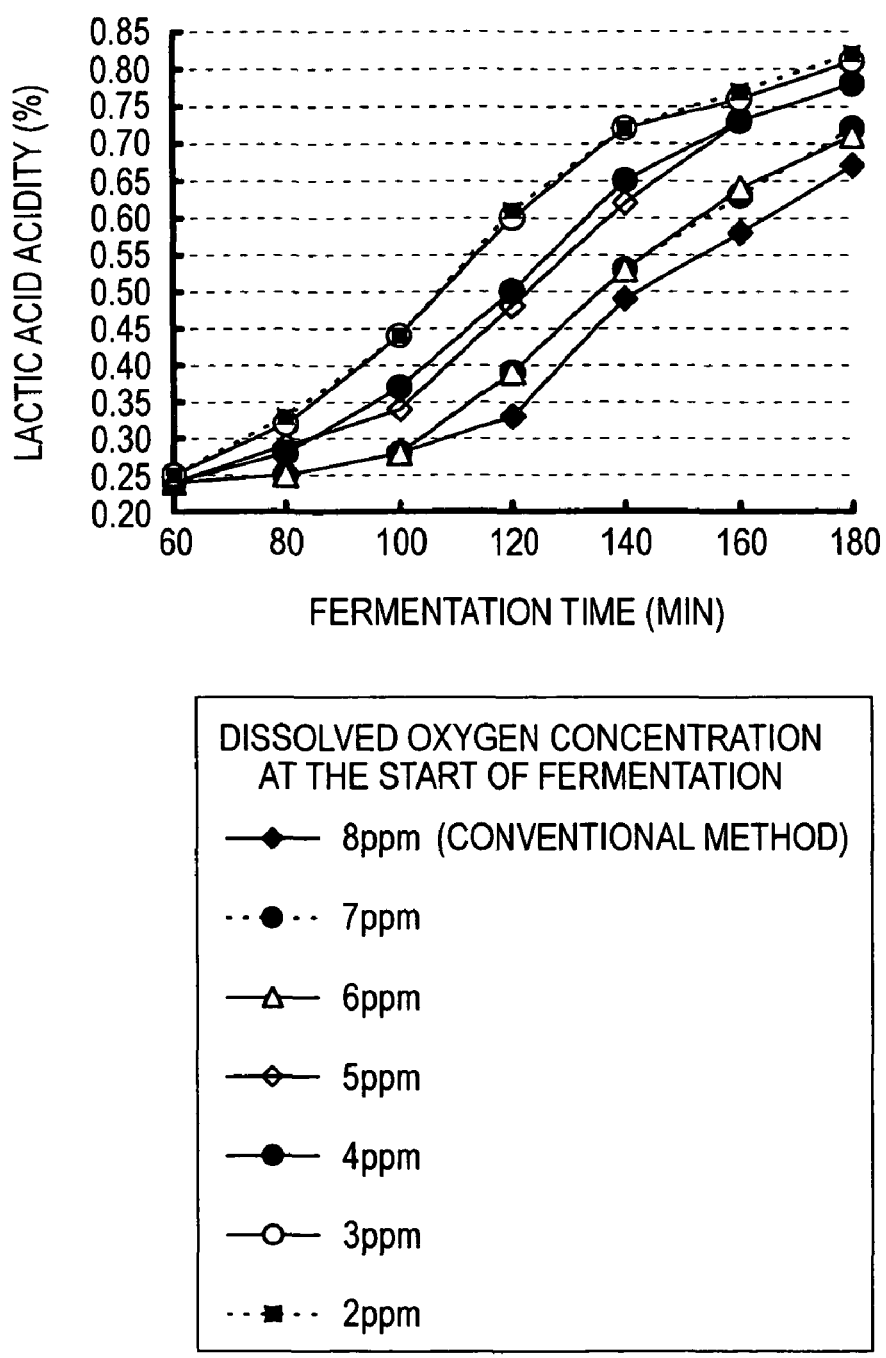
FIG. 1 is a figure showing the observation of the influence of the dissolved oxygen concentration in the mix on the fermentation time.
Figure 2:
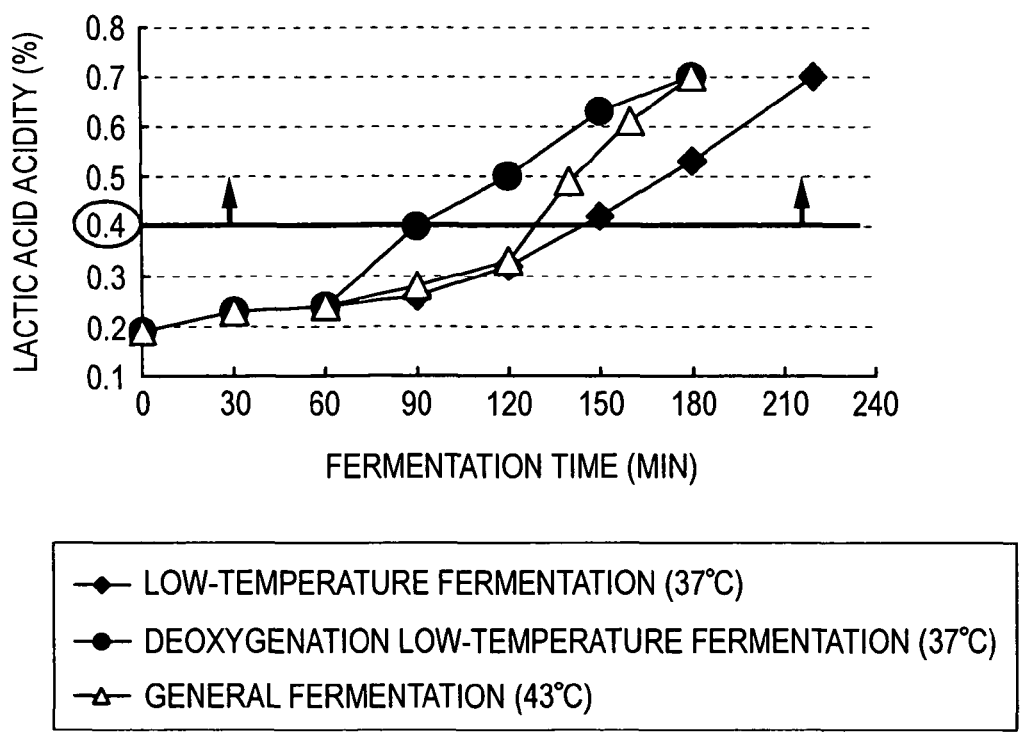
FIG. 2 is a figure showing the comparison in curd formation among the conventional method by fermentation at a low temperature of 37° C., the method of the present invention by fermentation at a low temperature of 37° C. and fermentation at general temperature.

The invention claimed is:

1. A method for producing fermented milk, which comprises
    reducing the concentration of dissolved oxygen in a mixture comprising milk at the start of fermentation to 5 ppm or less by substituting the dissolved oxygen with an inert gas selected from the group of nitrogen, argon, or helium gas; and
    carrying out fermentation at a fermentation temperature of from 30° C. to 37° C.

2. The method for producing fermented milk according to claim 1, wherein the period of carrying out fermentation is shorter than a period of carrying out fermentation without reducing the concentration of dissolved oxygen at the fermentation temperature.

3. The fermented milk produced by the method according to claim 2.

4. The fermented milk produced by the method according to claim 2, which has a penetration angle of 31° or less and a hardness of 40 g or more, wherein the hardness is an elasticity until break of the penetration angle curve obtained by a measurement of the penetration angle of a yogurt knife with a weight of 100 g using a neocurd meter, and the penetration angle is an indicator of smoothness.

5. The fermented milk produced by the method according to claim 1.

6. The fermented milk produced by the method according to claim 1, which has a penetration angle of 31° or less and a hardness of 40 g or more, wherein the hardness is an elasticity until break of the penetration angle curve obtained by a measurement of the penetration angle of a yogurt knife with a weight of 100 g using a neocurd meter, and the penetration angle is an indicator of smoothness.

7. The method for producing fermented milk according to claim 1, wherein the inert gas is nitrogen.

8. The method for producing fermented milk according to claim 1, further comprising subjecting the mixture to sterilization, prior to the step of reducing the concentration of dissolved oxygen in the mixture,
    wherein the sterilization, reducing the concentration of dissolved oxygen, and fermentation are carried out in this order.

9. A fermented milk, which has a penetration angle of 31° or less and a hardness of 40 g or more, wherein the hardness is an elasticity until break of the penetration angle curve obtained by a measurement of the penetration angle of a yogurt knife with a weight of 100 g using a neocurd meter, and the penetration angle is an indicator of smoothness.

* * * * *